United States Patent
Kawasaki et al.

(10) Patent No.: US 10,675,719 B2
(45) Date of Patent: Jun. 9, 2020

(54) JOINING MEMBER, SOLDER MATERIAL, SOLDER PASTE, FORMED SOLDER, FLUX COATED MATERIAL, AND SOLDER JOINT

(71) Applicant: Senju Metal Industry Co., Ltd., Tokyo (JP)

(72) Inventors: Hiroyoshi Kawasaki, Tokyo (JP); Shigeki Kondo, Tochigi (JP); Atsushi Ikeda, Tochigi (JP); Takahiro Roppongi, Tochigi (JP); Takashi Hagiwara, Tochigi (JP); Daisuke Soma, Tochigi (JP); Kaichi Tsuruta, Tochigi (JP); Isamu Sato, Saitama (JP); Yuji Kawamata, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 348 days.

(21) Appl. No.: 15/539,323

(22) PCT Filed: Dec. 24, 2015

(86) PCT No.: PCT/JP2015/086136
§ 371 (c)(1),
(2) Date: Jun. 23, 2017

(87) PCT Pub. No.: WO2016/104658
PCT Pub. Date: Jun. 30, 2016

(65) Prior Publication Data
US 2018/0015572 A1    Jan. 18, 2018

(30) Foreign Application Priority Data
Dec. 26, 2014 (JP) ................... 2014-264998

(51) Int. Cl.
*B23K 35/00* (2006.01)
*B23K 35/26* (2006.01)
(Continued)

(52) U.S. Cl.
CPC ............ *B23K 35/262* (2013.01); *B22F 1/025* (2013.01); *B22F 9/08* (2013.01); *B23K 1/00* (2013.01);
(Continued)

(58) Field of Classification Search
CPC .............. B23K 35/262; B23K 2101/36; B23K 35/0244; B23K 35/302
See application file for complete search history.

(56) References Cited

U.S. PATENT DOCUMENTS 6,287,444 B1    9/2001   Nishiuchi et al.
6,518,667 B1 *  2/2003   Ichida .............. H01L 23/49816
                                                          257/734
(Continued)

FOREIGN PATENT DOCUMENTS

CN       1191789 A       9/1998
CN     102051657 A       5/2011
(Continued)

*Primary Examiner* — Erin B Saad
(74) *Attorney, Agent, or Firm* — The Webb Law Firm

(57) ABSTRACT

Provided herein is a solder material that includes a spherical core that provides space between a joint object and another object to be joined to the joint object and a solder coated layer that has a melting point at which a core layer of the core is not melted. The solder coated layer includes Sn as a main ingredient and 0 to 2 mass % of Ag, and coats the core. The solder coated layer has an average grain diameter of crystal grains of 3 μm or less, and the solder material has a spherical diameter of 1 to 230 μm and a sphericity of 0.95 or more.

9 Claims, 3 Drawing Sheets

(51) Int. Cl.
    *C22C 13/00*     (2006.01)
    *C25D 3/60*     (2006.01)
    *B23K 35/22*     (2006.01)
    *B23K 35/02*     (2006.01)
    *B23K 1/00*     (2006.01)
    *C25D 3/56*     (2006.01)
    *C22C 9/00*     (2006.01)
    *C25D 3/32*     (2006.01)
    *B23K 3/06*     (2006.01)
    *C25D 3/18*     (2006.01)
    *C25D 7/00*     (2006.01)
    *B22F 1/02*     (2006.01)
    *B22F 9/08*     (2006.01)
    *B23K 35/30*     (2006.01)
    *C23C 18/32*     (2006.01)
    *C25D 5/10*     (2006.01)
    *C25D 5/12*     (2006.01)
    *C25D 5/18*     (2006.01)

(52) U.S. Cl.
    CPC .............. *B23K 3/06* (2013.01); *B23K 35/025* (2013.01); *B23K 35/0244* (2013.01); *B23K 35/22* (2013.01); *B23K 35/3033* (2013.01); *C22C 9/00* (2013.01); *C22C 13/00* (2013.01); *C23C 18/32* (2013.01); *C25D 3/18* (2013.01); *C25D 3/32* (2013.01); *C25D 3/562* (2013.01); *C25D 3/60* (2013.01); *C25D 7/00* (2013.01); *B22F 2301/10* (2013.01); *B22F 2301/15* (2013.01); *C25D 5/10* (2013.01); *C25D 5/12* (2013.01); *C25D 5/18* (2013.01)

(56) References Cited

U.S. PATENT DOCUMENTS

| | | | |
|---|---|---|---|
| 7,265,046 | B2 | 9/2007 | Kondo et al. |
| 2002/0051728 | A1* | 5/2002 | Sato ............... B22F 1/0048 |
| | | | 420/562 |
| 2003/0059642 | A1 | 3/2003 | Mei |
| 2014/0010705 | A1* | 1/2014 | Kanou ............... C22C 9/00 |
| | | | 420/491 |
| 2015/0380373 | A1* | 12/2015 | Moon ............... H01L 24/17 |
| | | | 257/738 |
| 2016/0148885 | A1 | 5/2016 | Kawasaki et al. |
| 2016/0368105 | A1 | 12/2016 | Hattori et al. |

FOREIGN PATENT DOCUMENTS

| | | |
|---|---|---|
| EP | 1028180 A1 | 8/2000 |
| EP | 1551211 A1 | 7/2005 |
| EP | 3067151 A1 | 9/2016 |
| JP | 617258 A | 1/1994 |
| JP | 2007125610 A | 5/2007 |
| JP | 4831502 B2 | 12/2011 |
| JP | 5036265 B2 | 9/2012 |
| JP | 201389913 A | 5/2013 |
| JP | 2013152867 A | 8/2013 |
| JP | 201429855 A | 2/2014 |
| JP | 5585750 B1 | 9/2014 |
| JP | 5585751 B1 | 9/2014 |
| WO | 2014203348 A1 | 12/2014 |

\* cited by examiner

JOINING MEMBER, SOLDER MATERIAL, SOLDER PASTE, FORMED SOLDER, FLUX COATED MATERIAL, AND SOLDER JOINT

CROSS-REFERENCE TO RELATED APPLICATIONS

This application is the United States national phase of International Application No. PCT/JP2015/086136 filed Dec. 24, 2015, and claims priority to Japanese Patent Application No. 2014-264998 filed Dec. 26, 2014, the disclosures of which are hereby incorporated in their entirety by reference.

TECHNICAL FIELD

The present invention relates to a joining member, a solder material, a solder paste, formed solder, a flux coated material, and a solder joint.

BACKGROUND

In recent years, together with development of compact information devices, downsizing of electronic components to be installed thereon have rapidly been progressed. In order to meet the downsizing requirement, a ball grid array (hereinafter, referred to as "BGA"), in which electrodes are provided on a back surface thereof, is applied to an electronic component to cope with the small and narrow connection terminal or the reduced mounting area.

As an electronic component to which the BGA is applied, for example, a semiconductor package is exemplified. In the semiconductor package, a semiconductor chip having electrodes is sealed with a resin. On the electrodes of the semiconductor chip, solder bumps are formed. The solder bumps are formed by joining solder balls to the electrodes of the semiconductor chip. The semiconductor package to which the BGA is applied is mounted on a printed circuit board by joining the solder bumps melted by heating to conductive lands of the printed circuit board. Further, in order to meet the higher-density mounting requirement, a three-dimensional high-density mounting has been developed in which semiconductor packages are stacked in the height direction.

However, when a BGA is applied to a semiconductor package in which the three-dimensional high-density mounting is used, there is a case where solder balls are collapsed by the weight of the semiconductor package itself. If such an accident happens, an appropriate space cannot be maintained between substrates.

Thus, a solder bump has been studied which is formed by electrically connecting a Cu ball, a Cu core ball or the like to the electrode of an electronic component with the use of solder paste. Such solder bumps formed by using Cu balls can support a semiconductor package by the Cu balls or the like, which are not melted at the melting point of solder, even when the solder bumps receive the weight of the semiconductor package in mounting the electronic components on the printed circuit board. Therefore, the solder bumps are not collapsed by the weight of the semiconductor package itself. Here, the Cu core ball is one obtained by coating the surface of a Cu ball with Sn plating, Ni plating, or Sn—Ag—Cu plating.

For example, Patent Document 1 discloses a ball for connection terminal formed by performing tin-silver-copper-containing plating on a spherical body made of a metal or an alloy and having a diameter of 10 to 1000 μm, the plating containing 0.5 to 3.4 mass % of silver, 0.3 to 0.8 mass % of copper and the remainder of substantially tin and inevitable impurities. Patent Document 2 discloses a ball for connection terminal which includes a base plating layer containing Ni on a surface of a Cu core ball with the diameter of 10-1,000 μm, and a plated soldering layer having the composition containing, by mass, 0.3-2.0% of Ag, 0.05-1.0% of Cu, the remainder of Sn and inevitable impurities on a surface of the base plating layer.

Further, as a joining member that maintains space between substrates, a joining member using a resin or the like as a core other than a joining member using a Cu ball as a core has been developed. Patent Document 3 discloses a conductive particle including a base particle made of a resin, a copper layer provided on a surface of the base particle, and a solder layer provided on a surface of the copper layer. Patent Document 4 discloses a conductive particle including a resin particle and a conductive layer provided on a surface of the resin particle.

DOCUMENTS FOR PRIOR ART

Patent Documents

Patent Document 1: Japanese Patent No. 5036265
Patent Document 2: Japanese Patent No. 4831502
Patent Document 3: Japanese Patent Application Publication No. 2013-152867
Patent Document 4: Japanese Patent Application Publication No. 2014-29855

SUMMARY OF THE INVENTION

Problems to be Solved by the Invention

However, the above-described balls for connection terminal and the like disclosed in Patent Documents 1 to 4 have the following problems. Namely, the solder plating, Ni plating or the like that coats the surface of the above-described Cu ball or the like is formed by a wet plating method in which crystal grains are easily grown. Accordingly, there is a problem such that a grown crystal grain causes the sphericity thereof to be reduced, and thus, an ideal sphericity is not realized in the Cu core ball or the like. Particularly, since the average grain diameter of the crystal grains becomes constant when the Cu core ball or the like has a smaller diameter, a problem such that the sphericity thereof is significantly reduced is more likely to occur.

Further, the Cu core ball has a plating layer containing Ag as a plating layer that coats the core thereof. However, in recent years, there has been a demand for a plating layer having a low-Ag composition for the purpose of cost reduction. Patent Document 1 states that when a Cu core ball having a spherical diameter of 230 μm or less is used, a sphericity of 0.95 or less is achieved. However, the Ag content of the plating film is set high to achieve the above sphericity. Therefore, there is a problem such that the plating film cannot meet the requirement of low-Ag composition.

Further, in the case of wet plating, a concentration gradient occurs. When performing the plating using a noble metal such as Ag in Sn-based solder plating, Ag is likely to be deposited on the Cu ball side thereof. Therefore, the surface side of the plating layer has a low Ag content and an Sn content close to 100%. Particularly, this tendency is remarkable in a low-Ag composition. When the amount of an element other than Sn, such as Ag, is small, crystal grains in solder plating are grown, which reduces sphericity. Therefore, as described above, a Cu core ball using a plating layer having a low-Ag composition has a problem that its sphericity is reduced due to the growth of crystal grains.

The present invention is made in light of the above problems, and has an object to provide a joining member and a solder material that have a high sphericity, a solder paste, formed solder, a flux coated material and a solder joint.

Means for Solving the Problems

The present inventors have found that the sphericity of a joining material and a solder material can be increased by reducing the average grain diameter of crystal grains of an Ni-containing coated layer or a solder coated layer. The present invention provides the following.

(1) A solder material is characterized in that the solder material includes a spherical core that provides space between a joint object and another object to be joined to the joint object and a solder coated layer that has a melting point at which the core layer is not melted, contains Sn as a main ingredient and 0 to 2 mass % of Ag, and coats the core, wherein the solder coated layer has an average grain diameter of crystal grains of 3 μm or less, and the solder material has a spherical diameter of 1 to 230 μm and a sphericity of 0.95 or more.

(2) The solder material according to the above (1) is characterized in that the solder coated layer contains brightener.

(3) The solder material according to the above (1) or (2) is characterized in that the core is a spherical material made of an elemental metal, an alloy, a metal oxide, or a mixed metal oxide of Cu, Ni, Ag, Bi, Pb, Al, Sn, Fe, Zn, In, Ge, Sb, Co, Mn, Au, Si, Pt, Cr, La, Mo, Nb, Pd, Ti, Zr, or Mg, or a resin.

(4) The solder material according to any one of the above (1) to (3) is characterized in that the solder coated layer contains at least one selected from a group consisting of Cu, Bi, In, Zn, Ni, Co, Fe, Pb, P, Ge, Ga, and Sb as an additive element.

(5) The solder material according to any one of the above (1) to (4) is characterized in that a dose is 0.0200 cph/cm$^2$ or less.

(6) A method of manufacturing a solder material is characterized in that the method includes a manufacturing step of manufacturing the solder material having a spherical diameter of 1 to 230 μm and a sphericity of 0.95 or more by coating, on a spherical core that provides space between a joint object and another object to be joined to the joint object, a solder coated layer that has a melting point at which a core layer of the core is not melted, contains Sn as a main ingredient and 0 to 2 mass % of Ag wherein the solder coated layer has a grain diameter of crystal grains of 3 μm or less by adding brightener to plating solution for forming the solder coated layer in the manufacturing step.

(7) A solder paste is characterized in that the solder paste includes the solder material according to any one of the above (1) to (5).

(8) Formed solder is characterized in that the formed solder includes the solder material according to any one of the above (1) to (5).

(9) A flux coated material is characterized in that the flux coated material includes the solder material according to any one of the above (1) to (5).

(10) A solder joint is characterized in that the solder joint includes the solder material according to any one of the above (1) to (5).

Effects of the Invention

According to the present invention, a grain diameter of crystal grains in the Ni-containing coated layer of the joining material is 1 μm or less and an average grain diameter of crystal grains in the solder coated layer is 3 μm or less so that the joining material and the solder material allow having a sphericity of 0.95 or more. This makes it possible to prevent misalignment of the joining material or the solder material when the joining material or the solder material is mounted on electrodes.

EMBODIMENT FOR CARRYING OUT THE INVENTION

Hereinbelow, a preferred embodiment of the present invention will be described in detail with reference to the accompanying drawing. It is to be noted that an Ni-plated Cu ball 10 will be described as one example of a joining material according to the present invention, and a Cu core ball 30 will be described as one example of a solder material according to the present invention. Further, in this description, units (ppm, ppb, and %) relating to the composition of the Ni-plated Cu ball 10 and the Cu core ball 30 represent the ratios to the mass of the Ni-plated Cu ball 10 and the Cu core ball 30 (ppm by mass, ppb by mass, % by mass) unless otherwise specified.

(1) Regarding Ni-Plated Cu Ball 10

Figure 1:
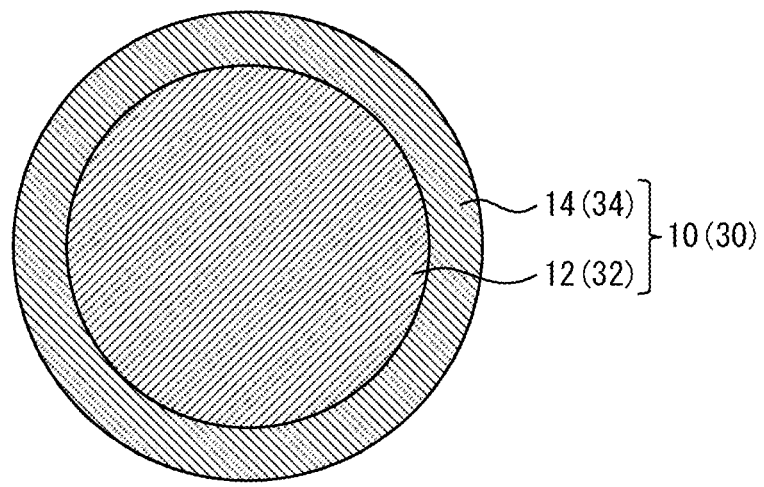
FIG. 1 is a diagram showing configuration examples of an Ni-plated ball 10 and a Cu core ball 30 according to one embodiment of the present invention.

As shown in FIG. 1, the Ni-plated Cu ball 10 according to the present invention includes a Cu ball 12 and an Ni plated layer 14 that coats the Cu ball 12. The Ni plated layer 14 has an average grain diameter of crystal grains of 1 μm or less. The Ni-plated Cu ball 10 has a spherical diameter of 1 to 230 μm and a sphericity of 0.95 or more. An adoption of such a configuration of the Ni-plated Cu ball 10 makes it possible, when the Ni-plated Cu balls 10 are mounted on electrodes, to prevent the misalignment of the Ni-plated Cu balls 10, and makes it possible to prevent the deterioration of the self-alignment property thereof.

It is to be noted that a case where the core is a Cu ball will be described below but the core used in the present invention is not limited to one having a composition of elemental Cu as long as it is spherical, and may have a composition of an alloy containing Cu as a main ingredient. When the Cu ball is made of an alloy, the Cu content thereof is 50 mass % or more. Alternatively, the ball constituting the core may be, other than Cu, configured as being made by an elemental metal of Ni, Ag, Bi, Pb, Al, Sn, Fe, Zn, In, Ge, Sb, Co, Mn, Au, Si, Pt, Cr, La, Mo, Nb, Pd, Ti, Zr, or Mg, an alloy thereof, a metal oxide thereof, or a mixed metal oxide thereof, or it may be configured as being made by a resin material.

Spherical Diameter of Ni-Plated Cu Ball 10: 1 to 230 μm

When a spherical diameter of the Ni-plated Cu ball 10 is set to be within a range of 1 to 230 μm, it is possible to provide a certain space between substrates and to prevent a short circuit between adjacent electrodes (terminals) of an electronic component during reflowing. Further, when a spherical diameter of the Ni-plated Cu ball 10 is set to be within a range of 1 to 230 μm, it is possible to cope with a demand for miniaturization of a substrate or a narrower pitch between electrodes of an electronic component, and it is also possible to cope with downsizing or higher integration of electronic components. It is to be noted that the spherical diameter refers to a diameter.

Sphericity of Ni-Plated Cu Ball 10: 0.95 or More

When a sphericity of the Ni-plated Cu ball 10 according to the present invention is set to be 0.95 or more, it is possible, when the Ni-plated Cu balls 10 are mounted on electrodes to perform reflowing, to prevent the misalignment of the Ni-plated Cu balls 10, and it is possible to prevent the deterioration of the self-alignment property of the Ni-plated Cu ball 10. The sphericity of the Ni-plated Cu ball 10 is more preferably of 0.990 or more. In the present invention, the sphericity of the Ni-coated Cu ball 10 is controlled to be 0.95 or more by setting the average grain diameter of crystal grains of the Ni plated layer 14 to be within a range of more than 0 μm but 1 μm or less.

It is to be noted that in the present invention, the sphericity refers to a deviation from a perfect sphere. The sphericity is determined by various methods such as a least square center (LSC) method, a minimum zone center (MZC) method, a maximum inscribed center (MIC) method, and a minimum circumscribed center (MCC) method. More specifically, the sphericity refers to an arithmetic average value calculated by dividing the diameter of each of, for example, 500 of the Ni-plated Cu balls 10 by the major axis thereof. When the value is closer to an upper limit of 1.00, this is closer to a perfect sphere. In the present invention, the length of major axis and the length of diameter are values measured by ULTRA Quick Vision, ULTRA QV350-PRO that is a measurement instrument manufactured by Mitutoyo Corporation.

When the Ni-plated Cu ball 10 is used as a solder bump, the Cu ball 12 remains without being melted at the temperature of soldering to maintain space between substrates. That is, the Cu ball 12 functions as a column even when a solder plated layer or the like around the Cu ball 12 is melted by reflowing so that a certain space is maintained between a semiconductor package as an electronic component (a joint object) and a printed circuit board (another object to be joined to the joint object). Therefore, balls having a high sphericity and showing small variations in particle diameter are adopted as the Cu balls 12 in the present invention.

Sphericity of Cu Ball 12: 0.95 or More

The Cu ball 12 constituting the Ni-coated Cu ball 10 according to the present invention preferably has a sphericity of 0.95 or more from the viewpoint of controlling a standoff height. If the sphericity of the Cu ball 12 is less than 0.95, the Cu ball 12 has an indefinite shape. In this case, bumps that are not uniform in height are formed during bump formation, which increases a possibility that poor bonding occurs. The sphericity is more preferably 0.990 or more. It is to be noted that the definition of the sphericity of the Cu ball 12 is the same as that of the sphericity of the above-described Ni-plated Cu ball 10, and therefore a detailed description thereof will be omitted.

Purity of Cu Ball 12: 99.9% or More but 99.995% or Less

When the purity of the Cu ball 12 is set to be within the above range, a sufficient amount of crystal cores of impurity elements can be contained in Cu, which makes it possible to make the crystal grains of the Cu ball 12 small. On the other hand, if the amount of impurity elements is small, the amount of a material forming crystal cores is relatively small. In this case, crystal grains grow in a certain direction without inhibition of grain growth, which makes the crystal grains of the Cu ball 12 large. The lower limit of the purity of the Cu ball 12 is not particularly limited, but is preferably 99.9% or more from the viewpoint of reducing an α dose and preventing a reduction in the electric conductivity or the heat conductivity of the Cu ball 12 due to a reduction in purity.

U: 5 Ppb or Less, Th: 5 Ppb or Less

U and Th are radioactive elements, and therefore their contents need to be reduced to prevent a soft error. Each of the U content and the Th content needs to be 5 ppb or less so that the α dose of the Ni-coated Cu ball 10 is 0.0200 cph/cm$^2$ or less. Further, from the viewpoint of preventing a soft error in a present or future high-density mounting, each of the U content and the Th content is preferably 2 ppb or less.

Total of Impurity Element Contents: 1 ppm or More

The Cu ball 12 constituting the Ni-plated Cu ball 10 according to the present invention contains impurity elements such as Sn, Sb, Bi, Zn, As, Ag, Cd, Ni, Pb, Au, P, S, In, Co, Fe, U, and Th and contains a total of the impurity element contents of 1 ppm or more. It is to be noted that the amounts of Pb and Bi contained as impurity elements therein are preferably as small as possible.

α Dose: 0.0200 cph/cm$^2$ or Less

The α dose of the Cu ball 12 constituting the Ni-plated Cu ball 10 according to the present invention is preferably of 0.0200 cph/cm$^2$ or less from the viewpoint of preventing a soft error. This is an α dose such that a soft error does not occur in high-density mounting of electronic components. From the viewpoint of preventing a soft error in higher-density mounting, the α dose of the Cu ball 12 is more preferably of 0.0010 cph/cm$^2$ or less.

Ni Plated Layer 14 (Ni-Containing Coated Layer)

The Cu ball 12 is coated with the Ni plated layer 14 made of elemental Ni except impurities as an Ni-containing coated layer constituting the present invention. The Ni plated layer 14 has the function of suppressing the diffusion of Cu into solder during bonding of the Ni-plated ball 10 to an electrode. This makes it possible to prevent Cu leaching of the Cu ball 12 and therefore to prevent an intermetallic compound from being formed by the reaction between Cu in the Cu ball 12 and a metal element in solder paste used for joining. To the Ni plated layer 14, an element such as Co or Fe may be added. Further, when the core is made of elemental Ni, the sphericity of the core can be increased by coating the core with the Ni plated layer.

Average Grain Diameter of Crystal Grains of Ni Plated Layer 14: More than 0 μm but 1 μm or Less The average grain diameter of crystal grains of the Ni plated layer 14 is more than 0 μm but 1 μm or less. When the average grain diameter of the crystal grains is set to be within a range of more than 0 μm but 1 μm or less, it is possible to reduce the surface irregularities of the Ni plated layer 14 to make the surface of the Ni plated layer 14 smooth. This allows the Ni-plated Cu ball 10 to have a sphericity of 0.95 or more. In the present invention, in order to allow the average grain diameter of crystal grains of the Ni plated layer 14 to fall in the above range, the Ni plated layer 14 is formed by, for example, adding brightener to a plating solution so as to contain the brightener in the Ni plated layer 14. By adding the brightener to the Ni plated layer 14, the growth direction of plating can be adjusted (controlled) so that the average grain diameter of the crystal grains can be controlled to be more than 0 μm but 1 μm or less. By increasing the amount of the brightener to be added to the plating solution used to form the Ni plated layer 14, a reduction in the average grain diameter of crystal grains of the Ni plated layer 14 can further be promoted, which makes it possible to provide a Ni plated Cu ball 10 having a high sphericity. However, if a large amount of brightener remains on the surface of the Ni plated Cu ball 10 after solder plating, the brightener in the plating promotes the oxidation of solder, which inhibits, when the Ni plated Cu ball 10 is bonded to an electrode, the solder plated layer 14 from spreading on the electrode. Therefore, the Ni plated Cu ball 10 after formation of the solder plated layer 14 is preferably washed in water, a weak acid aqueous solution, or an organic solvent such as IPA with stirring. By subjecting the Ni plated Cu ball 10 to such a washing process, the brightener remaining on the surface of the solder plated layer is washed away, which makes it possible to achieve excellent spreadability during joining. In this way, a Ni plated Cu ball 10 having a high sphericity and excellent solder wettability during joining can be provided. Therefore, it is possible, when the Ni plated Cu ball 10 is joined to an electrode, to prevent the misalignment thereof and to prevent the deterioration of the self-alignment property thereof.

Brightener

As the brightener to be added to the plating solution used to form the Ni plated layer 14, for example, aldehyde compounds, condensed-ring compounds, ketones, Schiff condensation compounds, and water-soluble polymers are used.

As the aldehyde compounds, for example, aliphatic aldehydes and aromatic aldehydes are used. Specifically, the followings are exemplified: 1-naphthaldehyde, 2-naphthaldehyde, o-chlorobenzaldehyde, m-chlorobenzaldehyde, p-chlorobenzaldehyde, acetaldehyde, salicylaldehyde, 2-thiophenaldehyde, 3-thiophenaldehyde, o-anisaldehyde, m-anisaldehyde, p-anisaldehyde, salicylaldehyde allyl ether, benzaldehyde, 2,4,6-trichlorobenzaldehyde, p-nitrobenzaldehyde, furfural, 2-hydroxy-1-naphthaldehyde, 3-acenaphthaldehyde, benzylideneacetone, pyridylideneacetone, furfurylideneacetone, cinnamaldehyde, anisaldehyde, crotonaldehyde, acrolein, glutaraldehyde, paraldehyde, vanillin, valeraldehyde, p-hydroxybenzaldehyde, 2-hydroxy-1-naphthaldehyde, 4-hydroxy-1-naphthaldehyde, 2-chloro-1-naphthaldehyde, 4-chloro-1-naphthaldehyde, 2-thiophenecarboxyaldehyde, 3-thiophenecarboxyaldehyde, 2-furaldehyde, 3-furaldehyde, 3-indole carboxyaldehyde, o-phthalaldehyde, formaldehyde, propanal, butylaldehyde, isobutylaldehyde, pentanal, hexanal, propionaldehyde, n-valeraldehyde, succindialdehyde, capronaldehyde, isovaleraldehyde, allylaldehyde, 2-chlorobenzaldehyde, 2,4-dichlorobenzaldehyde, 4-methyl-1-naphthaldehyde, 2-chloro-1-naphthaldehyde, 4-chloro-1-naphthaldehyde, allylaldehyde, benzyl crotonaldehyde, glyoxal, 1-benzylidene-7-heptanal, 2,4-hexadienal, veratraldehyde, p-tolualdehyde, 2,6-dichlorobenzaldehyde, monohydroxybenzaldehyde, dihydroxybenzaldehyde, α-naphthaldehyde, and β-naphthaldehyde.

As the condensed-ring compounds, for example, triazines, triazoles, and benzothiazoles are used. Specifically, the followings are exemplified: triazine, imidazole, indole, quinoline, 2-vinylpyridine, aniline, phenanthroline, neocuproine, picolinic acid, thioureas, N-(3-hydroxybutylidene)-p-sulfanilic acid, N-butylidene sulfanilic acid, N-cinnamoylidene sulfanilic acid, 2,4-diamino-6-(2'-methylimidazolyl(1'))ethyl-1,3,5-triazine, 2,4-diamino-6-(2'-ethyl-4-methylimidazolyl(1'))ethyl-1,3,5-triazine, 2,4-diamino-6-(2'-undecylimidazolyl(1'))ethyl-1,3,5-triazine, phenyl salicylate, benzothiazole, 2-mercaptobenzothiazole, 2-methylbenzothiazole, 2-aminobenzothiazole, 2-amino-6-methoxybenzothiazole, 2-methyl-5-chlorobenzothiazole, 2-hydroxybenzothiazole, 2-amino-6-methylbenzothiazole, 2-chlorobenzothiazole, 2,5-dimethylbenzothiazole, 5-hydroxy-2-methylbenzothiazole, 2-(methylmercapto)benzothiazole, 2-hydroxybenzothiazole, 2-chlorobenzothiazole, 6-nitro-2-mercaptobenzothiazole, and 2-benzothiazole thioacetic acid.

As the ketones, for example, aliphatic ketones and aromatic ketones are used. Specifically, the followings are exemplified: furfurylideneacetone, anisylideneacetone, benzylidene methyl isobutyl ketone, 3-chlorobenzylidene acetone, pyridylideneacetone, furfurylidineacetone, thenylideneacetone, benzylidene acetylacetone, benzalacetone, 4-(1-naphthyl)-3-butene-2-one, 4-(2-furyl)-3-butene-2-one, 4-(2-thiophenyl)-3-butene-2-one, acetophenone, 2,4-dichloroacetophenone, 3,4-dichloroacetophenone, benzylidene acetophenone, and vinyl phenyl ketone.

As the Schiff condensation compounds, for example, o-toluidine, a reaction product between acetaldehyde and o-toluidine, a reaction product between acetaldehyde and aniline, a reaction product between aldol and o-nitroaniline, and a reaction product between monoethanolamine and o-vanilline are exemplified.

As the water-soluble polymers, for example, polyethylene glycol, polyvinyl alcohol, polyvinyl pyrrolidone, and gelatin are exemplified.

It is to be noted that the brightener other than the above examples can include the following materials. For example, α-naphthol, β-naphthol, β-naphthalenesulfonic acid, polypeptone, phenanthroline-based compounds, bipyridyl, aldol, acetylacetone, amine-aldehyde condensates, mesityl oxide, isophorone, diacetyl, 3,4-hexanedione, curcumin, 2-cinnamyl thiophene, 2-(ω-benzoyl)vinylfuran, acrylic acid, methacrylic acid, ethacrylic acid, ethyl acrylate, methyl methacrylate, butyl methacrylate, crotonic acid, propylene-1,3-dicarboxylic acid, cinnamic acid, o-toluidine, m-toluidine, p-toluidine, o-aminoaniline, p-aminoaniline, o-chloroaniline, p-chloroaniline, 2,5-chloromethylaniline, 3,4-chloromethylaniline, N-monomethylaniline, 4,4'-diaminodiphenylmethane, N-phenyl-α-naphthylamine, N-phenyl-β-naphthylamine, methylbenzotriazole, 1,2,3-triazine, 1,2,4-triazine, 1,3,5-triazine, 1,2,3-benzotriazine, catechol, hydroquinone, resorcin, polyethyleneimine, ethylenediaminetetraacetic acid disodium salt, glyoxal, and 2-oxy-3-methoxybenzaldehyde can be used.

Method for Producing Ni-Plated Cu Balls 10

Hereinbelow, one example of a method for producing Ni-plated Cu balls 10 according to the present invention will be described. First, a heat-resistant plate, such as a ceramic plate, is prepared. The heat-resistant plate has a plurality of circular dimples each having a semispherical bottom. Then, Cu material chips obtained by cutting a Cu fine wire as a raw material (hereinafter, referred to as "material chips") are put into the dimples of the heat-resistant plate one by one.

Then, the heat-resistant plate having the dimples into which the material chips have been put is heated to 1100 to 1300° C. in a furnace filled with a reducing gas, for example, decomposing ammonia gas to perform heat treatment for 30 to 60 minutes. At this time, the material chips are melted and become spherical when the temperature in the furnace reaches the melting point of Cu or higher. Then, the inside of the furnace is cooled so that Cu balls 12 are formed in the dimples of the heat-resistant plate. After the cooling, the formed Cu balls 12 may be again heat-treated at 800 to 1000° C. that is lower than the melting point of Cu.

As an alternative method, there is an atomizing method in which molten Cu is dropped through an orifice provided at the bottom of a crucible and the droplet is cooled to form the Cu balls 12 or a method in which cut metal of Cu is heated by thermal plasma to 1000° C. or higher to form them. The thus formed Cu balls 12 may be again heat-treated at a temperature of 800 to 1000° C. for 30 to 60 minutes. Before the formation of Cu balls 12, a Cu material as a raw material of Cu balls 12 may be heat-treated at 800 to 1000° C.

As the Cu material that is a raw material of Cu balls 12, for example, pellets, wires, and pillars are used. The purity of the Cu material may be 99.9 to 99.99% from the viewpoint of preventing the purity of Cu balls 12 from decreasing too much.

Further, when a high-purity Cu material is used, the holding temperature of melted Cu may be decreased to about 1000° C. in a conventional manner, without performing the above-described heat treatment. Accordingly, the above-described heat treatment may be appropriately omitted or changed depending on the purity of the Cu material.

Then, an Ni plated layer 14 is formed on the surface of each of the formed Cu balls 12. As a method of forming the Ni plated layer 14 on the surface of each of the Cu balls 12, a known electrolytic plating method or the like may be adopted. More specifically, an Ni plating solution is prepared using nickel metal in an Ni plating bath, and the Cu balls 12 are immersed in the thus prepared Ni plating solution to form an Ni plated layer 14 on the surface of each of the Cu balls 12 by electrodeposition. It is to be noted that as another method of forming the Ni plated layer 14, a known electroless plating method may be adopted. After the plating processing, the drying is performed on them in the atmosphere or a $N_2$ atmosphere to obtain the Ni-plated Cu balls 10 according to the present invention.

(2) Cu Core Ball 30

Hereinbelow, the Cu core ball 30 according to the present invention will be described. The cross-sectional structure of the Cu core ball 30 is similar to that of the above-described Ni-plated Cu ball 10, and therefore the Cu core ball 30 will be described below with reference to the drawing (FIG. 1) as in the case of the Ni-plated Cu ball 10. As shown in FIG. 1 (numerals enclosed in parentheses are codes), the Cu core ball 30 according to the present invention includes a Cu ball 32 and a solder plated layer (solder coated layer) 34 coating the Cu ball 32. It is to be noted that a detailed description of portions of the Cu core ball 30, which are common for them in the above-described Ni-plated Cu ball 10, will be omitted.

The Cu core ball 30 has a spherical diameter of 1 to 230 μm and a sphericity of 0.95 or more. The solder plated layer 34 contains Sn as a main ingredient and 0 to 2 mass % of Ag, and has an average grain diameter of crystal grains of 3 μm or less. In the present invention, in order to allow the average grain diameter of crystal grains of the solder plated layer 34 to fall in the above range, the solder plated layer 34 is formed by, for example, adding brightener to a plating solution so that the solder plated layer 34 contains the brightener. By adding the brightener to the solder plated layer 34, the growth direction of plating can be adjusted (controlled) so that the average grain diameter of the crystal grains can be controlled to be more than 0 μm but 3 μm or less. By increasing an amount of the brightener to be added to the plating solution used to form the solder plated layer 34, a reduction in the average grain diameter of crystal grains of the solder plated layer 34 can further be promoted, which makes it possible to provide a Cu core ball 30 having a high sphericity. However, if a large amount of brightener remains on the surface of the Cu core ball 30 after solder plating, the brightener in the plating promotes the oxidation of solder, which inhibits, when the Cu core ball 30 is joined to an electrode, the solder plated layer 34 from wetting and spreading on the electrode. For this reason, the Cu core ball 30 after the formation of the solder plated layer 34 is preferably washed. By subjecting the Cu core ball 30 to such a washing process, the brightener remaining on the surface of the solder plated layer 34 is washed away, which makes it possible to achieve excellent spreadability during joining. In this way, a Cu core ball 30 having a high sphericity and excellent solder wettability during joining can be provided. Therefore, it is possible, when the Cu core ball 30 is mounted on an electrode, to prevent the misalignment thereof and to prevent the deterioration of the self-alignment property thereof.

Solder Plated Layer 34 (Solder Coated Layer)

The solder plated layer 34 has a melting point in a temperature zone (temperature range) in which the Cu ball 32 is not melted. The solder plated layer 34 may be made of elemental Sn, a lead-free solder alloy mainly containing Sn, or an Sn—Pb solder alloy. As one example of the lead-free solder composition, for example, Sn, Sn—Ag alloys, Sn—Cu alloys, Sn—Bi alloys, Sn—Ag—Cu alloys, Sn—In alloys, and solders obtained by adding a predetermined alloy element thereto are exemplified. As the alloy element to be added, for example, Bi, In, Zn, Ni, Co, Fe, Pb, P, Ge, Ga, and Sb are exemplified. It is to be noted that in the present invention, the lead-free solder alloy mainly containing Sn has an Sn content of 40 mass % or more, preferably 80 mass % or more, more preferably 90 mass % or more. The solder plated layer 34 may have a multi-layered structure.

Ag Content of Solder Plated Layer 34: 0 to 2.0 Mass %

When Ag content added into the solder plated layer 34 is controlled to be within the above range, Ag may be not used or the Ag content may be lower than ever before, thereby achieving lower costs.

Method for Producing Cu Core Balls

The description of common points to the above-described Ni-plated Cu ball 10 will be omitted and only different points will be described. When the Cu balls 32 are formed by the above-described method, a solder plated layer 34 is formed on the surfaces of the Cu balls 32. For example, there are any methods, such as a known electrolytic plating method including a barrel plating method, a method in which a pump connected to a plating tank generates high-speed turbulence in a plating solution contained in the plating tank, and the solder plated layer 34 is formed on the Cu balls 32 by the turbulence of the plating solution, or a method in which a vibration plate provided in a plating tank is vibrated at a predetermined frequency to stir a plating solution by high-speed turbulence and the solder plated layer 34 is formed on the Cu balls 32 by the turbulence of the plating solution. After the plating processing, the drying in the atmosphere or a $N_2$ atmosphere enables Cu core balls 30 according to the present invention to be obtained.

It is to be noted that the Cu core ball 30 according to the present invention may be produced by previously coating the surface of the Cu ball 32 with a plating layer (intermediate layer) made of another metal before the formation of the solder plated layer 34. For example, when the surface of the Cu ball 32 is previously coated with an Ni plated layer, a Co plating layer or the like, diffusion of Cu into solder can be decreased during the joining of the Cu core ball 30 to an electrode, which makes it possible to prevent Cu leaching from the Cu ball 32. Further, the metal constituting the plating layer is not limited to a single metal, and may be an alloy made of two or more elements selected from Ni, Co and the like. The intermediate layer may have a multi-layered structure.

Further, the Ni-plated Cu balls 10 and the Cu core balls 30 according to the present invention may be used for a solder paste or formed solder, in which they are dispersed in the solder. In the solder paste and the formed solder, for example, a solder alloy having a composition of Sn—Ag—Cu is used, but the present invention is not limited to this solder alloy. Further, the Ni-plated Cu ball 10 and the Cu core ball 30 according to the present invention may be used for a solder joint of an electronic component.

The Ni-plated Cu ball 10 and the Cu core ball 30 according to the present invention may be used for forming a solder joint for joining electrodes. In this embodiment, the solder joint refers to, for example, as a structure in which a solder bump is mounted on an electrode of a printed-circuit board. Further, the solder bump refers to, for example, as a structure in which the Ni-plated Cu ball 10 or the Cu core ball 30 is mounted on an electrode of a semiconductor chip.

Further, there may be a flux-coated material in which the outermost surfaces of the above-mentioned Ni-plated Cu ball 10 and Cu core ball 30 are coated with a flux layer. This allows the oxidation of the metal surfaces of the Ni-plated Cu balls 10 and the like to be suppressed during storage etc. The flux layer may be constituted from a single layer made of one or two or more compounds. Alternatively, the flux layer may be constituted from two or more layers made of two or more compounds.

Executed Example A

Hereinbelow, executed examples of the present invention will be described, but the present invention is not limited thereto. In the executed examples, Ni-plated Cu balls were produced by coating the surface of each of the Cu balls with an Ni plated layer, and the average grain diameter of crystal grains in the Ni-plated layer of the produced Ni-plated Cu balls and the sphericity of the Ni-plated Cu balls were respectively measured.

Production of Ni-Plated Cu Balls

Cu pellets or the like having a purity of, for example, 99.995% or less were prepared and put into a crucible. Then, the crucible was heated to a temperature of 1200° C. to perform heat treatment for 45 minutes. Then, molten Cu was dropped through an orifice provided at the bottom of the crucible and droplets were cooled to form Cu balls having a sphericity of 0.990 or more. Then, an Ni plated layer was formed on the surfaces of the obtained Cu balls to produce Ni-plated Cu balls. The film thickness of the Ni plated layer on one side thereof was 2 µm.

As the brightener, saccharin was used. The saccharin was used so that the concentration thereof was 3 g/L at the time of initial make-up of plating bath.

Sphericity

The sphericity of the Ni-plated Cu balls was measured using a CNC image measurement system. More specifically, a measurement instrument, ULTRA Quick Vision, ULTRA QV350-PRO manufactured by Mitutoyo Corporation was used. In the executed examples, a length of diameter and a length of major axis of each of the Ni-plated Cu balls were measured by the above measurement instrument and an arithmetic average value was calculated by dividing the length of diameter by the length of major axis of each of the 500 Ni-plated Cu balls to determine the sphericity. It is represented that the closer the value thereof is an upper limit of 1.00, this is closer to a perfect sphere.

Average Grain Diameter of Crystal Grains of Ni Plated Layer

The average grain diameter of crystal grains of the Ni plated layer constituting the Ni-plated Cu ball was measured using an SEM (Scanning Electron Microscope). More specifically, three of the Ni-plated Cu balls were randomly sampled, and images of the sampled three Ni-plated Cu balls were taken by the SEM. Then, an image in a certain range was extracted from each image of each Ni-plated Cu ball thus taken by the SEM, and 10 crystal grains (3×10 grains) were further selected in each of the extracted images. Then, the major side length of each of the selected crystal grains was actually measured, and each measured length was converted to an original magnification thereof to calculate an arithmetic average of grain diameters of the 3×10 crystal grains. This calculated value was determined as the average grain diameter of crystal grains of the Ni plated layer. It is to be noted that the crystal grains may be automatically measured using a computer.

Table 1 shows the results of measuring the average grain diameter of crystal grains of the Ni plated layer and the sphericity of the Ni-plated Cu balls in Executed Examples 1A to 5A and Comparative Examples 1A to 5A. It is to be noted that in Table 1, the average grain diameter of crystal grains of the Ni plated layer of the Ni-plated Cu balls was represented as "o" when it was equal to or less than a threshold value of 1 µm, and was represented as "x" when it exceeded 1 µm. Further, the sphericity of the Ni-plated Cu balls was represented as "o" when it was equal to or more than a threshold value of 0.95, and was represented as "x" when it was less than 0.95.

In Executed Examples 1A to 5A, the Ni plated layer was formed by adding brightener to a plating solution, and the Ni-plated Cu balls having spherical diameters of 30 µm, 50 µm, 75 µm, 100 µm, and 230 µm were used, respectively. In Comparative Examples 1A to 5A, the Ni plated layer was formed without adding any brightener to a plating solution, and the Ni-plated Cu balls having spherical diameters of 30 µm, 50 µm, 75 µm, 100 µm, and 230 µm were used, respectively. In Reference Examples 1, 3, and 5, the Ni plated layer was formed by adding brightener to a plating solution, and the Ni-plated Cu balls having spherical diameters of 250 µm, 350 µm, and 600 µm were used, respectively. In Reference Examples 2, 4, and 6, the Ni plated layer was formed without adding any brightener to a plating solution, and the Ni-plated Cu balls having spherical diameters of 250 µm, 350 µm, and 600 µm were used, respectively.

TABLE 1

| | | Ni plated layer | | |
|---|---|---|---|---|
| | Spherical Diameter of Cu core balls (µm) | Addition or no Addition of Brightener | Average Grain Diameter of Crystal Grains is 1 µm or less: o | Sphericity of Cu core balls is 0.95 or more: o |
| Executed Example 1A | 30 | Added | o | o |
| Executed Example 2A | 50 | Added | o | o |
| Executed Example 3A | 75 | Added | o | o |
| Executed Example 4A | 100 | Added | o | o |
| Executed Example 5A | 230 | Added | o | o |

TABLE 1-continued

| | Ni plated layer | | | |
|---|---|---|---|---|
| | Spherical Diameter of Cu core balls (μm) | Addition or no Addition of Brightener | Average Grain Diameter of Crystal Grains is 1 μm or less: ○ | Sphericity of Cu core balls is 0.95 or more: ○ |
| Comparative Example 1A | 30 | Not Added | x | x |
| Comparative Example 2A | 50 | Not Added | x | x |
| Comparative Example 3A | 75 | Not Added | x | x |
| Comparative Example 4A | 100 | Not Added | x | x |
| Comparative Example 5A | 230 | Not Added | x | x |
| Reference Example 1A | 250 | Added | ○ | ○ |
| Reference Example 2A | 250 | Not Added | x | ○ |
| Reference Example 3A | 350 | Added | ○ | ○ |
| Reference Example 4A | 350 | Not Added | x | ○ |
| Reference Example 5A | 600 | Added | ○ | ○ |
| Reference Example 6A | 600 | Not Added | x | ○ |

As shown in the Executed Examples 1A to 5A, when the Ni-plated Cu balls had a spherical diameter of 230 μm or less and the Ni plated layer contained a brightener, the Ni plated layer had an average grain diameter of crystal grains of 1 μm or less, and the Ni-plated Cu balls had a sphericity of 0.95 or more. From the result, it is confirmed that the Ni-plated Cu balls of Examples 1A to 5A satisfies the requirement of sphericity.

On the other hand, as shown in Comparative Examples 1A to 5A, when the Ni-plated Cu balls had a spherical diameter of 230 μm or less but the Ni plated layer did not contain any brightener, the Ni plated layer had an average grain diameter of crystal grains of more than 1 μm, and the Ni-plated Cu balls had a sphericity of less than 0.95. From the result, it is confirmed that the Ni-plated Cu balls of Comparative Examples 1A to 5A do not satisfy the requirement of sphericity according to the present invention, and are therefore not suitable as the Ni-plated Cu balls according to the present invention.

Further, as shown in Reference Examples 1A to 6A, when the Ni-plated Cu balls had a spherical diameter of more than 230 μm, the spherical diameter of the Cu balls was relatively larger than the size of crystal grains of the Ni plated layer, and therefore the Ni-plated Cu balls had a sphericity of 0.95 or more irrespective of whether the Ni plated layer contained the brightener. From the result, it is confirmed that the Ni-plated Cu balls of Reference Examples 1A to 6A achieve a desired sphericity without adding the brightener, and therefore do not have a problem to be solved by the present invention.

Executed Example B

Then, Cu core balls were produced by coating the surfaces of Cu balls with a solder plated layer, and the average grain diameter of crystal grains in the solder plated layer of the produced Cu core balls and the sphericity of the Cu balls were respectively measured. More specifically, Cu core balls were produced by coating the surfaces of the above-described Cu balls having a sphericity of 0.990 or more with a solder plated layer containing brightener and made of Sn or an Sn—Ag—Cu alloy. The spherical diameters of the Cu core balls used in this executed example, the spherical diameters and sphericities of the Cu balls constituting the Cu core balls, and the spherical diameters of the Cu balls after Ni plating are shown in the following Table 2. It is to be noted that the sphericity of the Cu core balls and the average grain diameter of crystal grains were measured using the same instruments as used in the Example A described above, and therefore a detailed description thereof will be omitted.

TABLE 2

| Spherical Diameter of Cu Balls (μm) | Sphericity of Cu Balls | Spherical Diameter of Cu Balls after Ni Plating (μm) | Spherical Diameter of Ni-Plated Cu balls after solder plating (μm) |
|---|---|---|---|
| 30 | 0.9901 | 34 | 50 |
| 75 | 0.9904 | 79 | 100 |
| 100 | 0.9931 | 104 | 140 |
| 170 | 0.9941 | 174 | 230 |
| 200 | 0.9926 | 204 | 240 |
| 250 | 0.9923 | 254 | 300 |
| 350 | 0.9889 | 354 | 400 |

In this example, commercially-available METASU FCB-71A (Solution A in Table 11) and METASU CB-71B (Solution B in Table 11) manufactured by YUKEN INDUSTRY CO., LTD. were used as brighteners so that the concentrations of the solution A and the solution B at the time of initial make-up of plating bath were 100 mL/L and 20 mL/L, respectively.

Table 3 shows the results of measuring the average grain diameter of crystal grains of the solder plated layer of the Cu core balls and the sphericity of the Cu core balls in Executed Examples 1B to 6B and Comparative Examples 1B to 5B. In the Executed Examples 1B to 6B, the Cu core balls having a spherical diameter of 50 μm were used, and the solder plated layer was formed by adding brightener to a plating solution. Further, the Cu core balls used in the Executed Example 1B had a composition of Sn: 100%, the Cu core balls used in the Executed Example 2B had a composition of Cu: 0.5% and Sn: rest, the Cu core balls used in the Executed Example 3B had a composition of Ag: 0.1%, Cu: 0.5%, and Sn: rest, the Cu core balls used in the Executed Example 4B had a composition of Ag: 0.5%, Cu: 0.5%, and Sn: rest, the Cu core balls used in the Executed Example 5B had a composition of Ag: 1%, Cu: 0.5%, and Sn: rest, and the Cu core balls used in the Executed Example 6B had a composition of Ag: 2%, Cu: 0.5%, and Sn: rest.

In the Comparative Examples 1B to 5B, the Cu core balls having a spherical diameter of 50 μm were used, and the solder plated layer was formed without adding any brightener to a plating solution. Further, the Cu core balls used in the Comparative Example 1B had a composition of Sn: 100%, the Cu core balls used in the Comparative Example 2B had a composition of Cu: 0.5% and Sn: rest, the Cu core balls used in the Comparative Example 3B had a composition of Ag: 0.5%, Cu: 0.5%, and Sn: rest, the Cu core balls used in the Comparative Example 4B had a composition of Ag: 1%, Cu: 0.5%, and Sn: rest, and the Cu core balls used in the Comparative Example 5B had a composition of Ag: 2%, Cu: 0.5%, and Sn: rest.

In Reference Examples 1B and 2B, the Cu core balls having a spherical diameter of 50 μm were used, and the solder plated layer was formed by adding brightener to a plating solution. Further, the Cu core balls used in the Reference Example 1B had a composition of Ag: 2.5%, Cu: 0.5%, and Sn: rest, and the Cu core balls used in the Reference Example 2B had a composition of Ag: 3%, Cu: 0.5%, and Sn: rest. In the Reference Examples 3B and 4B, the Cu core balls having a spherical diameter of 50 μm were used, and the solder plated layer was formed without adding any brightener to a plating solution. Further, the Cu core balls used in the Reference Example 3B had a composition of Ag: 2.5%, Cu: 0.5%, and Sn: rest, and the Cu core balls used in the Reference Example 4B had a composition of Ag: 3%, Cu: 0.5%, and Sn: rest.

In Comparative Examples 6B to 10B, the Cu core balls having a spherical diameter of 100 μm were used, and the solder plated layer was formed without adding any brightener to a plating solution. Further, the Cu core balls used in the Comparative Example 6B had a composition of Sn: 100%, the Cu core balls used in the Comparative Example 7B had a composition of Cu: 0.5% and Sn: rest, the Cu core balls used in the Comparative Example 8B had a composition of Ag: 0.5%, Cu: 0.5%, and Sn: rest, the Cu core balls used in the Comparative Example 9B had a composition of

TABLE 3

| | Spherical Diameter of Cu core balls (μm) | Amount of Ag Added (%) | Amount of Cu Added (%) | Amount of Sn Added (%) | Addition of Brightener | Average Grain Diameter of Crystal Grains is 3 μm or less: ○ | Sphericity of Cu core balls is 0.95 or more: ○ |
|---|---|---|---|---|---|---|---|
| Executed Example 1B | 50 | 0 | 0 | Rest | Added | ○ | ○ |
| Executed Example 2B | 50 | 0 | 0.5 | Rest | Added | ○ | ○ |
| Executed Example 3B | 50 | 0.1 | 0.5 | Rest | Added | ○ | ○ |
| Executed Example 4B | 50 | 0.5 | 0.5 | Rest | Added | ○ | ○ |
| Executed Example 5B | 50 | 1 | 0.5 | Rest | Added | ○ | ○ |
| Executed Example 6B | 50 | 2 | 0.5 | Rest | Added | ○ | ○ |
| Comparative Example 1B | 50 | 0 | 0 | Rest | Not Added | x | x |
| Comparative Example 2B | 50 | 0 | 0.5 | Rest | Not Added | x | x |
| Comparative Example 3B | 50 | 0.5 | 0.5 | Rest | Not Added | x | x |
| Comparative Example 4B | 50 | 1 | 0.5 | Rest | Not Added | x | x |
| Comparative Example 5B | 50 | 2 | 0.5 | Rest | Not Added | x | x |
| Reference Example 1B | 50 | 2.5 | 0.5 | Rest | Added | ○ | ○ |
| Reference Example 2B | 50 | 3 | 0.5 | Rest | Added | ○ | ○ |
| Reference Example 3B | 50 | 2.5 | 0.5 | Rest | Not Added | ○ | ○ |
| Reference Example 4B | 50 | 3 | 0.5 | Rest | Not Added | ○ | ○ |

Table 4 shows the results of measuring the average grain diameter of crystal grains of the solder plated layer of the Cu core balls and the sphericity of the Cu core balls in Executed Examples 7B to 12B and Comparative Examples 6B to 10B. In the Executed Examples 7B to 12B, the Cu core balls having a spherical diameter of 100 μm were used, and the solder plated layer was formed by adding brightener to a plating solution. Further, the Cu core balls used in the Executed Example 7B had a composition of Sn: 100%, the Cu core balls used in the Executed Example 8B had a composition of Cu: 0.5% and Sn: rest, the Cu core balls used in the Executed Example 9B had a composition of Ag: 0.1%, Cu: 0.5%, and Sn: rest, the Cu core balls used in the Executed Example 10B had a composition of Ag: 0.5%, Cu: 0.5%, and Sn: rest, the Cu core balls used in the Executed Example 11B had a composition of Ag: 1%, Cu: 0.5%, and Sn: rest, and the Cu core balls used in the Executed Example 12B had a composition of Ag: 2%, Cu: 0.5%, and Sn: rest.

Ag: 1%, Cu: 0.5%, and Sn: rest, and the Cu core balls used in the Comparative Example 10B had a composition of Ag: 2%, Cu: 0.5%, and Sn: rest.

In Reference Examples 5B and 6B, the Cu core balls having a spherical diameter of 100 μm were used, and the solder plated layer was formed by adding brightener to a plating solution. Further, the Cu core balls used in the Reference Example 5B had a composition of Ag: 2.5%, Cu: 0.5%, and Sn: rest, and the Cu core balls used in the Reference Example 6B had a composition of Ag: 3%, Cu: 0.5%, and Sn: rest. In the Reference Examples 7B and 8B, the Cu core balls having a spherical diameter of 100 μm were used, and the solder plated layer was formed without adding any brightener to a plating solution. Further, the Cu core balls used in the Reference Example 7B had a composition of Ag: 2.5%, Cu: 0.5%, and Sn: rest, and the Cu core balls used in the Reference Example 8B had a composition of Ag: 3%, Cu: 0.5%, and Sn: rest.

TABLE 4

| | Spherical Diameter of Cu core balls (μm) | Solder plated layer | | | | Average Grain Diameter of Crystal Grains is 3 μm or less: ○ | Sphericity of Cu core balls is 0.95 or more: ○ |
|---|---|---|---|---|---|---|---|
| | | Amount of Ag Added (%) | Amount of Cu Added (%) | Amount of Sn Added (%) | Addition of Brightener | | |
| Executed Example 7B | 100 | 0 | 0 | Rest | Added | ○ | ○ |
| Executed Example 8B | 100 | 0 | 0.5 | Rest | Added | ○ | ○ |
| Executed Example 9B | 100 | 0.1 | 0.5 | Rest | Added | ○ | ○ |
| Executed Example 10B | 100 | 0.5 | 0.5 | Rest | Added | ○ | ○ |
| Executed Example 11B | 100 | 1 | 0.5 | Rest | Added | ○ | ○ |
| Executed Example 12B | 100 | 2 | 0.5 | Rest | Added | ○ | ○ |
| Comparative Example 6B | 100 | 0 | 0 | Rest | Not Added | x | x |
| Comparative Example 7B | 100 | 0 | 0.5 | Rest | Not Added | x | x |
| Comparative Example 8B | 100 | 0.5 | 0.5 | Rest | Not Added | x | x |
| Comparative Example 9B | 100 | 1 | 0.5 | Rest | Not Added | x | x |
| Comparative Example 10B | 100 | 2 | 0.5 | Rest | Not Added | x | x |
| Reference Example 5B | 100 | 2.5 | 0.5 | Rest | Added | ○ | ○ |
| Reference Example 6B | 100 | 3 | 0.5 | Rest | Added | ○ | ○ |
| Reference Example 7B | 100 | 2.5 | 0.5 | Rest | Not Added | ○ | ○ |
| Reference Example 8B | 100 | 3 | 0.5 | Rest | Not Added | ○ | ○ |

Table 5 shows the results of measuring the average grain diameter of crystal grains of the solder plated layer of the Cu core balls and the sphericity of the Cu core balls in Executed Examples 13B to 18B and Comparative Examples 11B to 15B. In the Executed Examples 13B to 18B, the Cu core balls having a spherical diameter of 140 μm were used, and the solder plated layer was formed by adding brightener to a plating solution. Further, the Cu core balls used in the Executed Example 13B had a composition of Sn: 100%, the Cu core balls used in the Executed Example 14B had a composition of Cu: 0.5% and Sn: rest, the Cu core balls used in the Executed Example 15B had a composition of Ag: 0.1%, Cu: 0.5%, and Sn: rest, the Cu core balls used in the Executed Example 16B had a composition of Ag: 0.5%, Cu: 0.5%, and Sn: rest, the Cu core balls used in the Executed Example 17B had a composition of Ag: 1%, Cu: 0.5%, and Sn: rest, and the Cu core balls used in the executed Example 18B had a composition of Ag: 2%, Cu: 0.5%, and Sn: rest.

In Comparative Examples 11B to 15B, the Cu core balls having a spherical diameter of 140 μm were used, and the solder plated layer was formed without adding any brightener to a plating solution. Further, the Cu core balls used in the Comparative Example 11B had a composition of Sn: 100%, the Cu core balls used in the Comparative Example 12B had a composition of Cu: 0.5% and Sn: rest, the Cu core balls used in the Comparative Example 13B had a composition of Ag: 0.5%, Cu: 0.5%, and Sn: rest, the Cu core balls used in the Comparative Example 14B had a composition of Ag: 1%, Cu: 0.5%, and Sn: rest, and the Cu core balls used in the Comparative Example 15B had a composition of Ag: 2%, Cu: 0.5%, and Sn: rest.

In Reference Examples 9B and 10B, the Cu core balls having a spherical diameter of 140 μm were used, and the solder plated layer was formed by adding brightener to a plating solution. Further, the Cu core balls used in the Reference Example 9B had a composition of Ag: 2.5%, Cu: 0.5%, and Sn: rest, and the Cu core balls used in the Reference Example 10B had a composition of Ag: 3%, Cu: 0.5%, and Sn: rest. In Reference Examples 11B and 12B, the Cu core balls having a spherical diameter of 140 μm were used, and the solder plated layer was formed without adding any brightener to a plating solution. Further, the Cu core balls used in the Reference Example 11B had a composition of Ag: 2.5%, Cu: 0.5%, and Sn: rest, and the Cu core balls used in the Reference Example 12B had a composition of Ag: 3%, Cu: 0.5%, and Sn: rest.

TABLE 5

| | Spherical Diameter of Cu core balls (μm) | Solder plated layer | | | | Average Grain Diameter of Crystal Grains is 3 μm or less: ○ | Sphericity of Cu core balls is 0.95 or more: ○ |
|---|---|---|---|---|---|---|---|
| | | Amount of Ag Added (%) | Amount of Cu Added (%) | Amount of Sn Added (%) | Addition of Brightener | | |
| Executed Example 13B | 140 | 0 | 0 | Rest | Added | ○ | ○ |
| Executed Example 14B | 140 | 0 | 0.5 | Rest | Added | ○ | ○ |
| Executed Example 15B | 140 | 0.1 | 0.5 | Rest | Added | ○ | ○ |
| Executed Example 16B | 140 | 0.5 | 0.5 | Rest | Added | ○ | ○ |
| Executed Example 17B | 140 | 1 | 0.5 | Rest | Added | ○ | ○ |
| Executed Example 18B | 140 | 2 | 0.5 | Rest | Added | ○ | ○ |
| Comparative Example 11B | 140 | 0 | 0 | Rest | Not Added | x | x |
| Comparative Example 12B | 140 | 0 | 0.5 | Rest | Not Added | x | x |
| Comparative Example 13B | 140 | 0.5 | 0.5 | Rest | Not Added | x | x |
| Comparative Example 14B | 140 | 1 | 0.5 | Rest | Not Added | x | x |
| Comparative Example 15B | 140 | 2 | 0.5 | Rest | Not Added | x | x |
| Reference Example 9B | 140 | 2.5 | 0.5 | Rest | Added | ○ | ○ |
| Reference Example 10B | 140 | 3 | 0.5 | Rest | Added | ○ | ○ |
| Reference Example 11B | 140 | 2.5 | 0.5 | Rest | Not Added | ○ | ○ |
| Reference Example 12B | 140 | 3 | 0.5 | Rest | Not Added | ○ | ○ |

Table 6 shows the results of measuring the average grain diameter of crystal grains of the solder plated layer of the Cu core balls and the sphericity of the Cu core balls in Executed Examples 19B to 24B and Comparative Examples 16B to 20B. In the Executed Examples 19B to 24B, the Cu core balls having a spherical diameter of 200 μm were used, and the solder plated layer was formed by adding brightener to a plating solution. Further, the Cu core balls used in the Executed Example 19B had a composition of Sn: 100%, the Cu core balls used in the Executed Example 20B had a composition of Cu: 0.5% and Sn: rest, the Cu core balls used in the Executed Example 21B had a composition of Ag: 0.1%, Cu: 0.5%, and Sn: rest, the Cu core balls used in the Executed Example 22B had a composition of Ag: 0.5%, Cu: 0.5%, and Sn: rest, the Cu core balls used in the Executed Example 23B had a composition of Ag: 1%, Cu: 0.5%, and Sn: rest, and the Cu core balls used in the Executed Example 24B had a composition of Ag: 2%, Cu: 0.5%, and Sn: rest.

In Comparative Examples 16B to 20B, the Cu core balls having a spherical diameter of 200 μm were used, and the solder plated layer was formed without adding any brightener to a plating solution. Further, the Cu core balls used in the Comparative Example 16B had a composition of Sn: 100%, the Cu core balls used in the Comparative Example 17B had a composition of Cu: 0.5% and Sn: rest, the Cu core balls used in the Comparative Example 18B had a composition of Ag: 0.5%, Cu: 0.5%, and Sn: rest, the Cu core balls used in the Comparative Example 19B had a composition of Ag: 1%, Cu: 0.5%, and Sn: rest, and the Cu core balls used in the Comparative Example 20B had a composition of Ag: 2%, Cu: 0.5%, and Sn: rest.

In Reference Examples 13B and 14B, the Cu core balls having a spherical diameter of 200 μm were used, and the solder plated layer was formed by adding brightener to a plating solution. Further, the Cu core balls used in the Reference Example 13B had a composition of Ag: 2.5%, Cu:

0.5%, and Sn: rest, and the Cu core balls used in the Reference Example 14B had a composition of Ag: 3%, Cu: 0.5%, and Sn: rest. In Reference Examples 15B and 16B, the Cu core balls having a spherical diameter of 200 μm were used, and the solder plated layer was formed without adding any brightener to a plating solution. Further, the Cu core balls used in the Reference Example 15B had a composition of Ag: 2.5%, Cu: 0.5%, and Sn: rest, and the Cu core balls used in the Reference Example 16B had a composition of Ag: 3%, Cu: 0.5%, and Sn: rest.

In Comparative Examples 21B to 25B, the Cu core balls having a spherical diameter of 230 μm were used, and the solder plated layer was formed without adding any brightener to a plating solution. Further, the Cu core balls used in the Comparative Example 21B had a composition of Sn: 100%, the Cu core balls used in the Comparative Example 22B had a composition of Cu: 0.5% and Sn: rest, the Cu core balls used in the Comparative Example 23B had a composition of Ag: 0.5%, Cu: 0.5%, and Sn: rest, the Cu core balls used in the Comparative Example 24B had a composition of

TABLE 6

| | Spherical Diameter of Cu core balls (μm) | Solder plated layer | | | | Average Grain Diameter of Crystal Grains is 3 μm or less: ○ | Sphericity of Cu core balls is 0.95 or more: ○ |
|---|---|---|---|---|---|---|---|
| | | Amount of Ag Added (%) | Amount of Cu Added (%) | Amount of Sn Added (%) | Addition of Brightener | | |
| Executed Example 19B | 200 | 0 | 0 | Rest | Added | ○ | ○ |
| Executed Example 20B | 200 | 0 | 0.5 | Rest | Added | ○ | ○ |
| Executed Example 21B | 200 | 0.1 | 0.5 | Rest | Added | ○ | ○ |
| Executed Example 22B | 200 | 0.5 | 0.5 | Rest | Added | ○ | ○ |
| Executed Example 23B | 200 | 1 | 0.5 | Rest | Added | ○ | ○ |
| Executed Example 24B | 200 | 2 | 0.5 | Rest | Added | ○ | ○ |
| Comparative Example 16B | 200 | 0 | 0 | Rest | Not Added | x | x |
| Comparative Example 17B | 200 | 0 | 0.5 | Rest | Not Added | x | x |
| Comparative Example 18B | 200 | 0.5 | 0.5 | Rest | Not Added | x | x |
| Comparative Example 19B | 200 | 1 | 0.5 | Rest | Not Added | x | x |
| Comparative Example 20B | 200 | 2 | 0.5 | Rest | Not Added | x | x |
| Reference Example 13B | 200 | 2.5 | 0.5 | Rest | Added | ○ | ○ |
| Reference Example 14B | 200 | 3 | 0.5 | Rest | Added | ○ | ○ |
| Reference Example 15B | 200 | 2.5 | 0.5 | Rest | Not Added | ○ | ○ |
| Reference Example 16B | 200 | 3 | 0.5 | Rest | Not Added | ○ | ○ |

Table 7 shows the results of measuring the average grain diameter of crystal grains of the solder plated layer of the Cu core balls and the sphericity of the Cu core balls in Executed Examples 25B to 30B and Comparative Examples 21B to 25B. In the Executed Examples 25B to 30B, the Cu core balls having a spherical diameter of 230 μm were used, and the solder plated layer was formed by adding brightener to a plating solution. Further, the Cu core balls used in the Executed Example 25B had a composition of Sn: 100%, the Cu core balls used in the Executed Example 26B had a composition of Cu: 0.5% and Sn: rest, the Cu core balls used in the Executed Example 27B had a composition of Ag: 0.1%, Cu: 0.5%, and Sn: rest, the Cu core balls used in the Executed Example 28B had a composition of Ag: 0.5%, Cu: 0.5%, and Sn: rest, the Cu core balls used in the Executed Example 29B had a composition of Ag: 1%, Cu: 0.5%, and Sn: rest, and the Cu core balls used in the Executed Example 30B had a composition of Ag: 2%, Cu: 0.5%, and Sn: rest.

Ag: 1%, Cu: 0.5%, and Sn: rest, and the Cu core balls used in the Comparative Example 25B had a composition of Ag: 2%, Cu: 0.5%, and Sn: rest.

In Reference Examples 17B and 18B, the Cu core balls having a spherical diameter of 230 μm were used, and the solder plated layer was formed by adding brightener to a plating solution. Further, the Cu core balls used in the Reference Example 17B had a composition of Ag: 2.5%, Cu: 0.5%, and Sn: rest, and the Cu core balls used in the Reference Example 18B had a composition of Ag: 3%, Cu: 0.5%, and Sn: rest. In Reference Examples 19B and 20B, the Cu core balls having a spherical diameter of 230 μm were used, and the solder plated layer was formed without adding any brightener to a plating solution. Further, the Cu core balls used in the Reference Example 19B had a composition of Ag: 2.5%, Cu: 0.5%, and Sn: rest, and the Cu core balls used in the Reference Example 20B had a composition of Ag: 3%, Cu: 0.5%, and Sn: rest.

TABLE 7

| | Spherical Diameter of Cu core balls (μm) | Amount of Ag Added (%) | Amount of Cu Added (%) | Amount of Sn Added (%) | Addition of Brightener | Average Grain Diameter of Crystal Grains is 3 μm or less: ○ | Sphericity of Cu core balls is 0.95 or more: ○ |
|---|---|---|---|---|---|---|---|
| Executed Example 25B | 230 | 0 | 0 | Rest | Added | ○ | ○ |
| Executed Example 26B | 230 | 0 | 0.5 | Rest | Added | ○ | ○ |
| Executed Example 27B | 230 | 0.1 | 0.5 | Rest | Added | ○ | ○ |
| Executed Example 28B | 230 | 0.5 | 0.5 | Rest | Added | ○ | ○ |
| Executed Example 29B | 230 | 1 | 0.5 | Rest | Added | ○ | ○ |
| Executed Example 30B | 230 | 2 | 0.5 | Rest | Added | ○ | ○ |
| Comparative Example 21B | 230 | 0 | 0 | Rest | Not Added | x | x |
| Comparative Example 22B | 230 | 0 | 0.5 | Rest | Not Added | x | x |
| Comparative Example 23B | 230 | 0.5 | 0.5 | Rest | Not Added | x | x |
| Comparative Example 24B | 230 | 1 | 0.5 | Rest | Not Added | x | x |
| Comparative Example 25B | 230 | 2 | 0.5 | Rest | Not Added | x | x |
| Reference Example 17B | 230 | 2.5 | 0.5 | Rest | Added | ○ | ○ |
| Reference Example 18B | 230 | 3 | 0.5 | Rest | Added | ○ | ○ |
| Reference Example 19B | 230 | 2.5 | 0.5 | Rest | Not Added | ○ | ○ |
| Reference Example 20B | 230 | 3 | 0.5 | Rest | Not Added | ○ | ○ |

Table 8 shows the results of measuring the average grain diameter of crystal grains of the solder plated layer of the Cu core balls and the sphericity of the Cu core balls in Reference Examples 21B to 36B. In the Reference Examples 21B to 28B, the Cu core balls having a spherical diameter of 240 μm were used, and the solder plated layer was formed by adding brightener to a plating solution. In the Reference Examples 29B to 36B, the Cu core balls having a spherical diameter of 240 μm were used, and the solder plated layer was formed without adding any brightener to a plating solution. Further, the Cu core balls used in the Reference Example 21B and 29B had a composition of Sn: 100%, the Cu core balls used in the Reference Examples 22B and 30B had a composition of Cu: 0.5% and Sn: rest, the Cu core balls used in the Reference Examples 23B and 31B had a composition of Ag: 0.1%, Cu: 0.5%, and Sn: rest, the Cu core balls used in the Reference Examples 24B and 32B had a composition of Ag: 0.5%, Cu: 0.5%, and Sn: rest, the Cu core balls used in the Reference Examples 25B and 33B had a composition of Ag: 1%, Cu: 0.5%, and Sn: rest, the Cu core balls used in the Reference Examples 26B and 34B had a composition of Ag: 2%, Cu: 0.5%, and Sn: rest, the Cu core balls used in the Reference Examples 27B and 35B had a composition of Ag: 2.5%, Cu: 0.5%, and Sn: rest, and the Cu core balls used in the Reference Examples 28B and 36B had a composition of Ag: 3%, Cu: 0.5%, and Sn: rest.

TABLE 8

| | Spherical Diameter of Cu core balls (μm) | Amount of Ag Added (%) | Amount of Cu Added (%) | Amount of Sn Added (%) | Addition of Brightener | Average Grain Diameter of Crystal Grains is 3 μm or less: ○ | Sphericity of Cu core balls is 0.95 or more: ○ |
|---|---|---|---|---|---|---|---|
| Reference Example 21B | 240 | 0 | 0 | Rest | Added | ○ | ○ |
| Reference Example 22B | 240 | 0 | 0.5 | Rest | Added | ○ | ○ |

TABLE 8-continued

|  | Solder plated layer | | | | | | |
|---|---|---|---|---|---|---|---|
|  | Spherical Diameter of Cu core balls (μm) | Amount of Ag Added (%) | Amount of Cu Added (%) | Amount of Sn Added (%) | Addition of Brightener | Average Grain Diameter of Crystal Grains is 3 μm or less: ○ | Sphericity of Cu core balls is 0.95 or more: ○ |
| Reference Example 23B | 240 | 0.1 | 0.5 | Rest | Added | ○ | ○ |
| Reference Example 24B | 240 | 0.5 | 0.5 | Rest | Added | ○ | ○ |
| Reference Example 25B | 240 | 1 | 0.5 | Rest | Added | ○ | ○ |
| Reference Example 26B | 240 | 2 | 0.5 | Rest | Added | ○ | ○ |
| Reference Example 27B | 240 | 2.5 | 0.5 | Rest | Added | ○ | ○ |
| Reference Example 28B | 240 | 3 | 0.5 | Rest | Added | ○ | ○ |
| Reference Example 29B | 240 | 0 | 0 | Rest | Not Added | x | ○ |
| Reference Example 30B | 240 | 0 | 0.5 | Rest | Not Added | x | ○ |
| Reference Example 31B | 240 | 0.1 | 0.5 | Rest | Not Added | x | ○ |
| Reference Example 32B | 240 | 0.5 | 0.5 | Rest | Not Added | x | ○ |
| Reference Example 33B | 240 | 1 | 0.5 | Rest | Not Added | x | ○ |
| Reference Example 34B | 240 | 2 | 0.5 | Rest | Not Added | x | ○ |
| Reference Example 35B | 240 | 2.5 | 0.5 | Rest | Not Added | ○ | ○ |
| Reference Example 36B | 240 | 3 | 0.5 | Rest | Not Added | ○ | ○ |

Table 9 shows the results of measuring the average grain diameter of crystal grains of the solder plated layer of the Cu core balls and the sphericity of the Cu core balls in Reference Examples 37B to 52B. In the Reference Examples 37B to 44B, the Cu core balls having a spherical diameter of 400 μm were used, and the solder plated layer was formed by adding brightener to a plating solution. In the Reference Examples 45B to 52B, the Cu core balls having a spherical diameter of 400 μm were used, and the solder plated layer was formed without adding any brightener to a plating solution. Further, the Cu core balls used in the Reference Examples 37B and 45B had a composition of Sn: 100%, the Cu core balls used in the Reference Examples 38B and 46B had a composition of Cu: 0.5% and Sn: rest, the Cu core balls used in the Reference Examples 39B and 47B had a composition of Ag: 0.1%, Cu: 0.5%, and Sn: rest, the Cu core balls used in the Reference Examples 40B and 48B had a composition of Ag: 0.5%, Cu: 0.5%, and Sn: rest, the Cu core balls used in the Reference Examples 41B and 49B had a composition of Ag: 1%, Cu: 0.5%, and Sn: rest, the Cu core balls used in the Reference Examples 42B and 50B had a composition of Ag: 2%, Cu: 0.5% and Sn: rest, the Cu core balls used in the Reference Examples 43B and MB had a composition of Ag: 2.5%, Cu: 0.5%, and Sn: rest, and the Cu core balls used in the Reference Examples 44B and 52B had a composition of Ag: 3%, Cu: 0.5%, and Sn: rest.

TABLE 9

| | Spherical Diameter of Cu core balls (μm) | Solder plated layer | | | | Average Grain Diameter of Crystal Grains is 3 μm or less: ○ | Sphericity of Cu core balls is 0.95 or more: ○ |
| | | Amount of Ag Added (%) | Amount of Cu Added (%) | Amount of Sn Added (%) | Addition of Brightener | | |
|---|---|---|---|---|---|---|---|
| Reference Example 37B | 400 | 0 | 0 | Rest | Added | ○ | ○ |
| Reference Example 38B | 400 | 0 | 0.5 | Rest | Added | ○ | ○ |
| Reference Example 39B | 400 | 0.1 | 0.5 | Rest | Added | ○ | ○ |
| Reference Example 40B | 400 | 0.5 | 0.5 | Rest | Added | ○ | ○ |
| Reference Example 41B | 400 | 1 | 0.5 | Rest | Added | ○ | ○ |
| Reference Example 42B | 400 | 2 | 0.5 | Rest | Added | ○ | ○ |
| Reference Example 43B | 400 | 2.5 | 0.5 | Rest | Added | ○ | ○ |
| Reference Example 44B | 400 | 3 | 0.5 | Rest | Added | ○ | ○ |
| Reference Example 45B | 400 | 0 | 0 | Rest | Not Added | x | ○ |
| Reference Example 46B | 400 | 0 | 0.5 | Rest | Not Added | x | ○ |
| Reference Example 47B | 400 | 0.1 | 0.5 | Rest | Not Added | x | ○ |
| Reference Example 48B | 400 | 0.5 | 0.5 | Rest | Not Added | x | ○ |
| Reference Example 49B | 400 | 1 | 0.5 | Rest | Not Added | x | ○ |
| Reference Example 50B | 400 | 2 | 0.5 | Rest | Not Added | x | ○ |
| Reference Example 51B | 400 | 2.5 | 0.5 | Rest | Not Added | ○ | ○ |
| Reference Example 52B | 400 | 3 | 0.5 | Rest | Not Added | ○ | ○ |

It is to be noted that in Tables 3 to 9, the average grain diameter of crystal grains of the solder plated layer of the Cu core balls was represented as "o" when it was equal to or less than a threshold value of 3 μm, and was represented as "x" when it exceeded 3 μm. Further, the sphericity of the Cu core balls was represented as "o" when it was equal to or more than a threshold value of 0.95, and was represented as "x" when it was less than 0.95.

As shown in the Executed Examples 1B to 30B, when the Cu core balls had a spherical diameter of 230 μm or less and the solder plated layer contained brightener, the average grain diameters of crystal grains of the solder plated layer were less than 3 μm, and the sphericities of the Cu core balls were 0.95 or more even when the amount of Ag added was 2% or less (low Ag). From the result, it has been confirmed that the Cu core balls of the Executed Examples 1B to 30B satisfy the requirement of sphericity according to the present invention.

On the other hand, as shown in the Comparative Examples 1B to 5B, 6B to 10B, 11B to 15B, 16B to 20B, and 21B to 25B, when the Cu core balls had a spherical diameter of 230 μm or less, the amount of Ag added was 2% or less (low Ag), and the solder plated layer did not contain any brightener, the average grain diameters of crystal grains of the solder plated layers were more than 3 μm, and the sphericity of Cu core balls were less than 0.95. From the result, it has been confirmed that the Cu core balls of the Comparative Examples 1B to 5B, 6B to 10B, 11B to 15B, 16B to 20B, and 21B to 25B do not satisfy the requirement of sphericity according to the present invention because they do not contain any brightener in their solder plated layers.

On the other hand, as shown in the Reference Examples 1B to 4B, 5B to 8B, 9B to 12B, 13B to 16B, and 17B to 20B, when the Cu core balls had a spherical diameter of 230 μm or less and the amount of Ag added was 2.5% or more, the average grain diameters of crystal grains of the solder plated layers were less than 3 μm, and the sphericities of Cu core balls were 0.95 or more irrespective of whether the brightener was added to the solder plated layer. From the result, it has been confirmed that the Cu core balls of the Reference Examples 1B to 4B, 5B to 8B, 9B to 12B, 13B to 16B, and 17B to 20B achieve a desired sphericity even when brightener is not added to the solder plated layer, and therefore do not have a problem to be solved by the present invention.

Further, as shown in the Reference Examples 21B to 52B, when a spherical diameter of the Cu core balls was more than 230 μm, the sphericity of the Cu core balls was 0.95 or more irrespective of whether the average grain diameter of crystal grains of the solder plated layer was less than 3 μm. From the result, it has been confirmed that when a spherical diameter is more than 230 μm in the Cu core balls of the Reference Examples 21B to 52B, they achieve a desired sphericity even when brightener or Ag is not added to the solder plated layer, and therefore, they do not have a problem to be solved by the present invention.

Executed Example C

Then, an Ni plated layer was formed on a Cu substrate, and the average grain diameter of crystal grains of the formed Ni plated layer was measured from the SEM image thereof. At this time, the amount of brightener added to a plating solution was gradually increased, and the size of crystal grains of the Ni plated layer was measured at each amount of the brightener added. The film thickness of the Ni plated layer was set to be 5 μm. As the brightener, saccharin was used. It is to be noted that the measurement instrument and the like used for the measurement of the average grain diameter of crystal grains of the Ni plated layer were the same as those used in the Executed Example A described above, and therefore a detailed description thereof will be omitted.

Table 10 shows the amounts of the brightener added to the plating solution, the SEM image of the Ni plated layer formed on the Cu substrate at each amount of the brightener added, and the average grain diameters of crystal grains of the Ni plated layers. Further, the calculation method of the average grain diameter of crystal grains of the Ni plated layer was the same as the calculation method in the Executed Example A, and therefore a detailed description thereof will be omitted.

TABLE 10

Figure 2A:
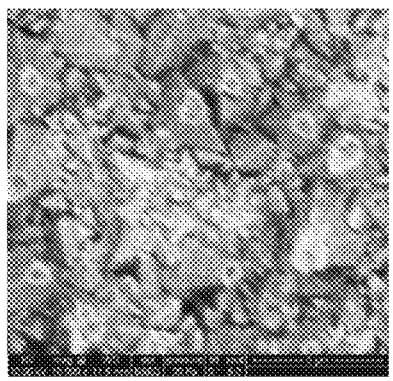
FIGS. 2A-F are SEM Images of a Ni plated layer formed on a Cu substrate according to certain embodiments of the present invention.
Figure 2B:
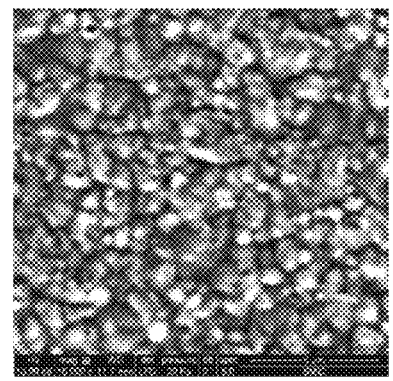
Figure 2C:
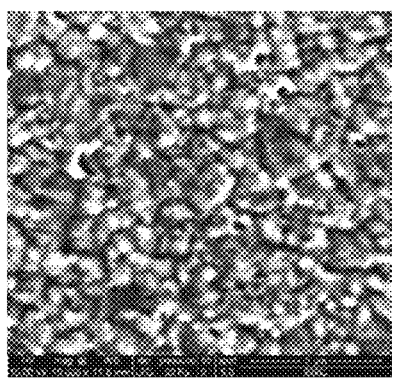
Figure 2D:
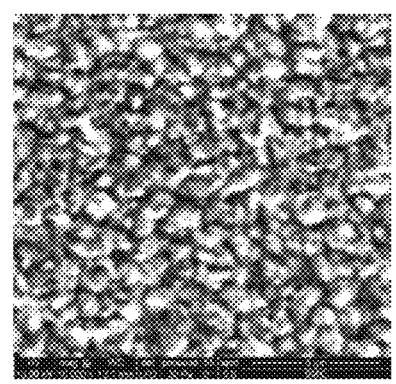
Figure 2E:
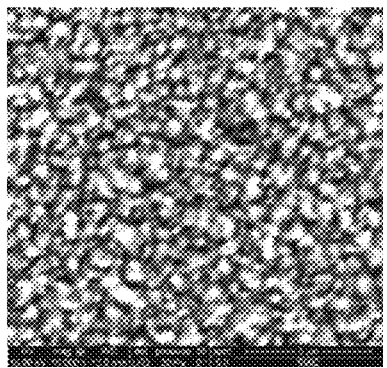
Figure 2F:
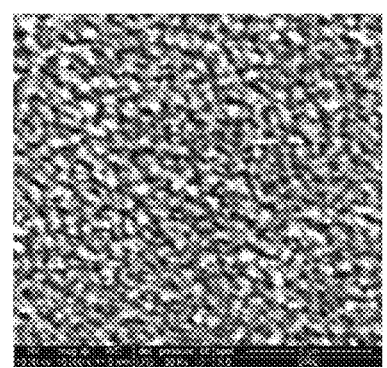

| Amount of Brightener Added | 0 g/L | 0.6 g/L | 1.2 g/L | 3 g/L | 6 g/L | 12 g/L |
|---|---|---|---|---|---|---|
| SEM Image | FIG. 2A | FIG. 2B | FIG. 2C | FIG. 2D | FIG. 2E | FIG. 2F |
| Average Grain Diameter of Crystal Grains | 2.43 μm | 0.98 μm | 0.97 μm | 0.82 μm | 0.66 μm | 0.54 μm |

It has been found that, as shown in Table 10, the average grain diameter of crystal grains of the Ni plated layer is reduced as the amount of the brightener added to the plating solution is increased. Further, it has been found that when the brightener is added to the plating solution, average grain diameters of crystal grains of all of the Ni plated layers are 1 μm or less, and therefore, surfaces of the Ni plated layers are smoothed. On the other hand, it has been found that when the brightener is not added to the plating solution, an average grain diameter of crystal grains of the Ni plated layer is more than 1 μm, and therefore, the surface of the Ni plated layer is not smoothed.

Further, relating to Cu core balls having a solder plated layer formed thereon with a composition of Cu: 0.7% and Sn: rest and Cu core balls having a solder plated layer formed thereon with a composition of Cu: 1% and Sn: rest, the Cu core balls, which were different in spherical diameter, were formed in the same manner as in the above-described experimental method and the average grain diameter of crystal grains and the sphericity of the Cu core balls were measured under the same conditions as those in the above-described experimental method. As a result, they showed the same tendency as the above-described experimental results depending on whether or not the brightener was added.

Then, a solder plated layer was formed on a Cu substrate, and the average grain diameter of crystal grains of the formed solder plated layer was measured from the SEM image thereof. At this time, the amount of brightener added to a plating solution was gradually increased, and the size of crystal grains of the solder plated layer was measured at each amount of the brightener added. The thickness of the solder plated layer was set to be 5 μm. For the solder plated layer, a solder alloy having a composition of Sn—Cu was used. As the brightener, commercially-available METASU FCB-71A (Solution A in Table 11) or METASU FCB-71B (Solution B in Table 11) manufactured by YUKEN INDUSTRY CO., LTD. were used.

It is to be noted that the measurement instrument and the like used for measuring the average grain diameter of crystal grains of the solder plated layer were the same as those used in the Executed Example A described above, and therefore a detailed description thereof will be omitted.

Table 11 shows the amounts of the brightener added to the plating solution, the SEM image of the solder plated layer formed on the Cu substrate at each amount of the brightener added, and the average grain diameters of crystal grains of the solder plated layers. Further, the calculation method of the average grain diameter of crystal grains of the solder plated layer was the same as the calculation method in the Executed Example A, and therefore a detailed description thereof will be omitted.

TABLE 11

Figure 3A:
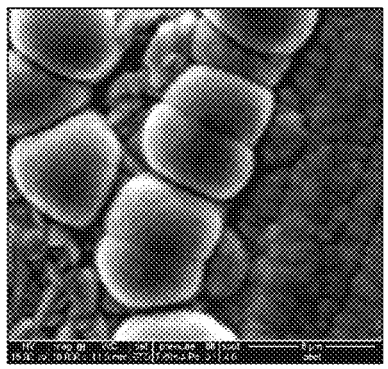
FIGS. 3A-F are SEM Images of a solder plated layer formed on a Cu substrate according to certain embodiments of the present invention.
Figure 3B:
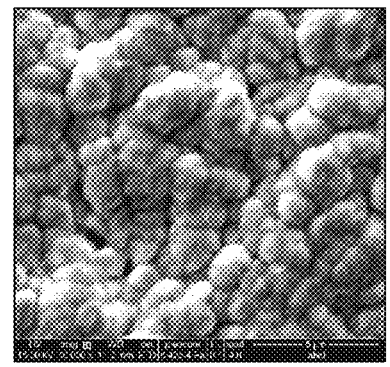
Figure 3C:
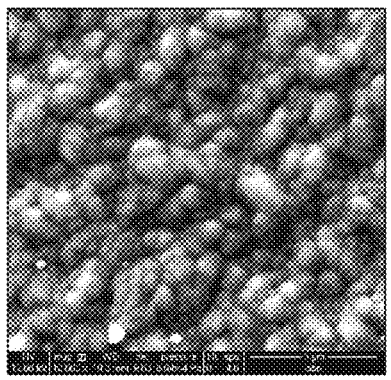
Figure 3D:
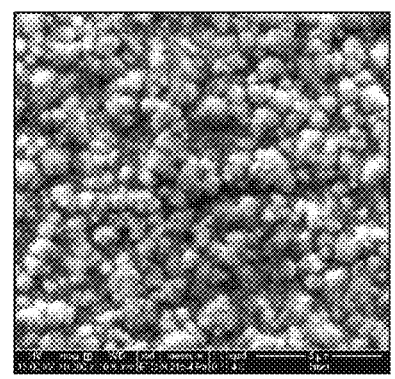
Figure 3E:
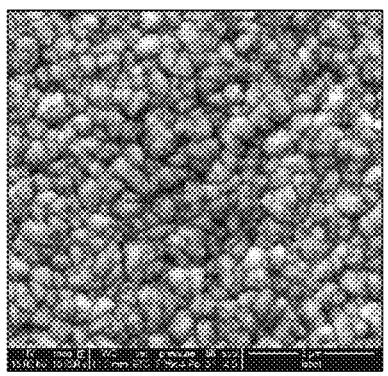
Figure 3F:
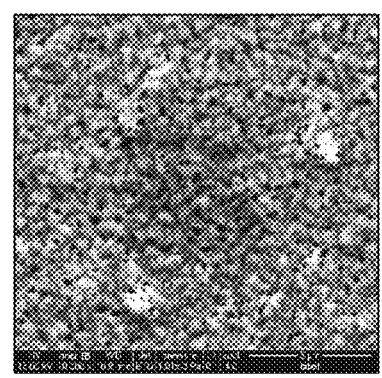

| Amount of Brightener Added Solution A | 0 ml/L | 25 ml/L | 50 ml/L | 75 ml/L | 100 ml/L | 200 ml/L |
|---|---|---|---|---|---|---|
| Amount of Brightener Added Solution B | 0 ml/L | 5 ml/L | 10 ml/L | 15 ml/L | 20 ml/L | 40 ml/L |
| SEM Image | FIG. 3A | FIG. 3B | FIG. 3C | FIG. 3D | FIG. 3E | FIG. 3F |
| Average Grain Diameter of Crystal Grains | 4.47 μm | 1.97 μm | 1.16 μm | 1.10 μm | 0.88 μm | 0.72 μm |

It has been found that, as shown in Table 11, the average grain diameter of crystal grains of the solder plated layer is reduced as the amount of the brightener added to the plating solution is increased. Further, it has been found that when the brightener is added to the plating solution, average grain diameters of crystal grains of all of the solder plated layers are 3 μm or less, and therefore, surfaces of the solder plated layers are smoothed. On the other hand, it has been found that when the brightener is not added to the plating solution, an average grain diameter of crystal grains of the solder plated layer is more than 3 μm, and therefore, the surface of the solder plated layer is not smoothed.

It is to be noted that the technical scope of the present invention is not limited to the above-described embodiments, and various changes may be made to the above-described embodiments without departing from the spirit of the present invention. For example, in the present invention, although the average grain diameter of crystal grains of the Ni plated layer (solder plated layer) is controlled to be 1 μm (3 μm) or less by adding brightener to them, the present invention is not limited thereto: For example, the average grain diameter of crystal grains of the Ni plated layer (solder plated layer) may be controlled to be 1 μm (3 μm) or less by performing plating processing for a longer period of time than usual at a current density lower than a standard density during plating processing or by optimizing the waveform of a power source based on a relationship with a plating solution.

EXPLANATION OF CODES

10: Ni-plated Cu ball (Joining material)
12, 32: Cu ball
14: Ni plated layer (Ni-containing coated layer)
34: Solder plated layer (Solder coated layer)
30: Cu core ball (Solder material)

The invention claimed is:

1. A solder material characterized in that the solder material comprises:
    a spherical core that provides space between a joint object and another object to be joined to the joint object; and
    a solder coated layer that has a melting point at which a core layer of the core is not melted, contains Sn as a main ingredient and 0 to 2 mass % of Ag, and coats the core, wherein
    the solder coated layer has an average grain diameter of crystal grains of 3 μm or less,
    the solder material has a spherical diameter of 1 to 230 μm and a sphericity of 0.95 or more, and
    the solder coated layer contains a brightener.

2. The solder material according to claim 1, wherein the core is a spherical material made of an elemental metal, an alloy, a metal oxide, or a mixed metal oxide of Cu, Ni, Ag, Bi, Pb, Al, Sn, Fe, Zn, In, Ge, Sb, Co, Mn, Au, Si, Pt, Cr, La, Mo, Nb, Pd, Ti, Zr, or Mg, or a resin.

3. The solder material according to claim 1, wherein the solder coated layer contains at least one selected from a group consisting of Cu, Bi, In, Zn, Ni, Co, Fe, Pb, P, Ge, Ga, and Sb as an additive element.

4. The solder material according to claim 1, wherein a dose is 0.0200 cph/cm2 or less.

5. A method of manufacturing a solder material wherein the method comprises:
    manufacturing the solder material having a spherical diameter of 1 to 230 μm and a sphericity of 0.95 or more by coating on a spherical core that provides space between a joint object and another object to be joined to the joint object, a solder coated layer that has a melting point at which a core layer of the core is not melted, and adding brightener to plating solution for forming the solder coated layer, wherein the solder coated layer contains Sn as a main ingredient and 0 to 2 mass % of Ag, wherein the solder coated layer has a grain diameter of crystal grains of 3 μm or less, and wherein the solder coated layer contains a brightener.

6. A solder paste wherein the solder paste comprises the solder material according to claim 1.

7. A formed solder wherein the formed solder comprises the solder material according to claim 1.

8. A flux coated material wherein the flux coated material comprises the solder material according to claim 1.

9. A solder joint wherein the solder joint comprises the solder material according to claim 1.

* * * * *